United States Patent [19]

Moy et al.

[11] Patent Number: 4,784,428
[45] Date of Patent: Nov. 15, 1988

[54] APPARATUS AND METHOD OF A CONVERTIBLE TOP WITH HARD GLASS WITH BOTTOM SEALING

[75] Inventors: Howard Moy, Rochester Hills; John C. Peck, Bloomfield Hills, both of Mich.

[73] Assignee: General Motors Corporation, Detroit, Mich.

[21] Appl. No.: 78,462

[22] Filed: Jul. 27, 1987

[51] Int. Cl.⁴ .............................. B60J 7/12; B60J 1/18
[52] U.S. Cl. .................................... 296/107; 296/122; 296/147; 296/201
[58] Field of Search ............... 296/107, 109, 116, 117, 296/121, 122, 201, 147

[56] References Cited

U.S. PATENT DOCUMENTS

| | | | |
|---|---|---|---|
| 3,332,169 | 7/1967 | Lohr et al. | 296/146 X |
| 3,385,629 | 5/1968 | Podolan | 296/146 |
| 4,693,509 | 9/1987 | Moy et al. | 296/201 |

*Primary Examiner*—Dennis H. Pedder
*Attorney, Agent, or Firm*—Ernest E. Helms

[57] ABSTRACT

The present invention provides a convertible top with a top cover over lay type seal between the rear window glass and the convertible top along side and lower edge of the window glass. The convertible top allows the utilization of a substantially rigid back window of a much greater area than previously allowable and provides a novel folding arrangement for storing the back window. The arrangement includes a first link pivotably connected with the vehicle. A trim link pivotally connected with the first link, extends rearwardly, and the trim link has a pivotally connected extension. An upper link is pivotally connected with the first link and the back window. The back window is also pivotally connected with the trim link extension. In a first top position the back window is urged against a lower sealing surface. In a second top position the back window is positioned in a generally vertical position away from the sealing surface. In a third position the back window is stored in the vehicle.

9 Claims, 2 Drawing Sheets

APPARATUS AND METHOD OF A CONVERTIBLE TOP WITH HARD GLASS WITH BOTTOM SEALING

FIELD OF THE INVENTION

The field of the present invention is that of automobile convertible tops. More particularly, the present invention relates to all convertible tops having a hard non-flexible back window.

DISCLOSURE STATEMENT

Prior to the present invention, many convertible tops utilize a flexible back window which was usually made from a plastic compound. Flexible windows allowed the use of convertible top linkage systems which are generally compact in the stored position since the window is allowed to bend.

The use of flexible materials for the rear window is undesirable due to the low stretch resistance of such materials and also because of their tendencies of age discoloration and/or cracking after prolonged exposure to the environment. Also most flexible materials cannot be electrically heated for defrosting. To overcome the above noted problems, many convertible tops utilize glass.

The use of glass in convertible tops presents a problem in that the glass must be handled carefully to prevent breakage. The size of a glass rear window is a function of the storage volume required for the linkage mechanism when the top is down. Most convertible tops with a glass rear window have the glass inserted into a pocket sewn into the cloth cover. Due to the requirements of being able to fold the convertible top into the storage space provided, the viewing area of the glass window area is usually much smaller (in comparison with the plastic window) since the glass cannot bend into the storage area. Attempts have been made to rectify the above situation by providing convertible vehicle tops wherein the glass breaks away from the convertible cover when the convertible top is folded. Examples of such tops are described and illustrated in Podolan, U.S. Pat. No. 3,385,629, and in Moy et al, U.S. Pat. No. 4,693,509, both commonly assigned. The Moy et al and Podolan convertible tops have a rear window which has an overlay type seal along the window glass top and side edges. The present invention provides a convertible top with an overlay type seal along the bottom and side edges of the window glass. Therefore the window glass of the convertible top of the present invention can be fixably connected with the cover along its top edge.

SUMMARY OF THE INVENTION

The present invention provides a convertible top wherein the glass sealably mates with the remainder of the convertible top along the lower edge of the glass when the glass is in the upright position. The convertible top of the present invention may be placed into the well of the vehicle by pivoting the trim stick up, placing the glass in a nearly vertical position separated from a sealing surface of the convertible top (usually provided by the trim stick), and then pivoting a first link, typically the side window, downward placing the convertible top into the well of the vehicle.

It is an object of the present invention to provide a convertible vehicle top wherein the window glass along a bottom edge may break away from the remainder of the convertible top when folding.

It is another object of the present invention to provide a convertible top having a relatively large sized viewing area hard, non-flexible back window.

It is another object of the present invention to provide a convertible vehicle top having a first upright position, a second intermediate folded position and a third stored position, the top including a first link pivotally connected with the vehicle, a trim link pivotally connected with the first link having a portion projecting generally rearward in the first position, an upper link pivotally connected with the first link above the pivotal connection of the first link with the vehicle, a trim link extension pivotally connected to the trim link generally opposite the pivotal connection of the trim link with the first link, a lower sealing surface orientated generally transverse to a portion of the trim link, and a non-flexible back window generally transverse with the first link and pivotally connected with the upper link and the trim link extension whereby sequentially the back window in the first position is urged to mate with the lower sealing surface and whereby pivotal movement of the trim link from the first position causes the back window to be positioned generally vertically into a second intermediate position separated from the lower sealing surface and whereby pivotal movement of the first link from the second position causes the back window to be moved from the second intermediate generally vertical position to a third position to be stored into the vehicle.

It is another object of the present invention to provide a vehicle convertible top for a vehicle having cam surfaces, the top having a first upright position, a second intermediate folded position and a third stored position, the top including a cover for covering the top, a forward linkage for supporting a portion of the cover, looped first links pivotally connected with the vehicle providing side windows for the top, the first links having a pivotal axis generally transverse to the cover, and the first links having attached thereto a first rear bow for supporting a rearward portion of the cover, a crescent shaped trim link extending rearwardly from and pivotally connected with the first links providing an inclined lower sealing surface orientated generally parallel with the pivotal axis of the first links, trim link extensions pivotally connected with the trim link separated from one another by the lower sealing surface and resting on the cam surfaces, an upper link pivotally connected with each of the respective first link above the pivotal connection of the first links with the vehicle, the upper link being connected with a second rear bow for supporting a portion of the cover rearward of the first rear bow, and a non-flexible back window connected adjacent a top edge with the cover and being pivotally connected with the upper links and the trim link extensions whereby sequentially the back window in the first position is urged to mate with the lower sealing surface of the trim link and whereby pivotal movement of the trim link from the first position to the second position causes the back window to assume an intermediate generally vertical position separated from the lower sealing surface and whereby sequentially rotation of the first link from the second position to the third position causes the back window to be stored into the vehicle.

It is another object of the present invention to provide a method of folding and storing a vehicle convertible top including a cover and a non-flexible back window wherein the back window seals along a lower sealing surface, the method including the steps of pivotally connecting a first link to the vehicle generally transverse to the cover, pivotally connecting to the first link a trim link extending rearwardly, pivotally connecting to the first link above the pivotal connection of the first link with the trim link an upper window link, pivotally connecting the non-flexible back window to the upper link and to a trim link extension pivotally connected with the trim link whereby the back window is urged to mate with the lower sealing surface, pivoting the trim link to a second intermediate folded position whereby the back window is brought to a second generally vertical position, and pivoting the first link with respect to the vehicle whereby the top is pivoted to a third stored position within the vehicle.

Other objects, desires and advantages of the present invention will become more apparent to those skilled in the art as the nature of the invention is better understood from the accompanying drawings and a detailed description.

DETAILED DESCRIPTION OF THE DRAWINGS

Figure 1:
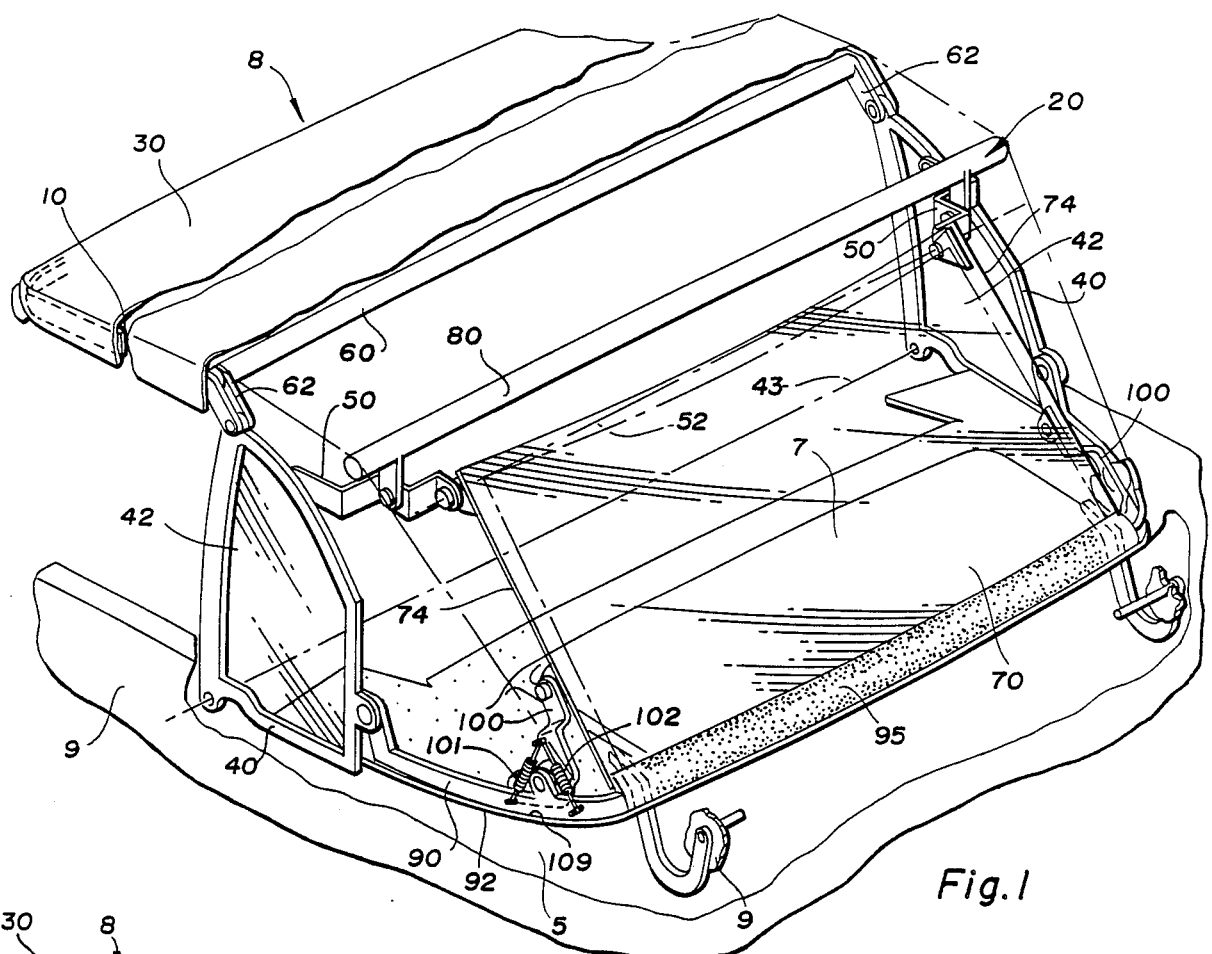
FIG. 1 is a perspective view of a preferred embodiment vehicle convertible top of the present invention.
Figure 2:
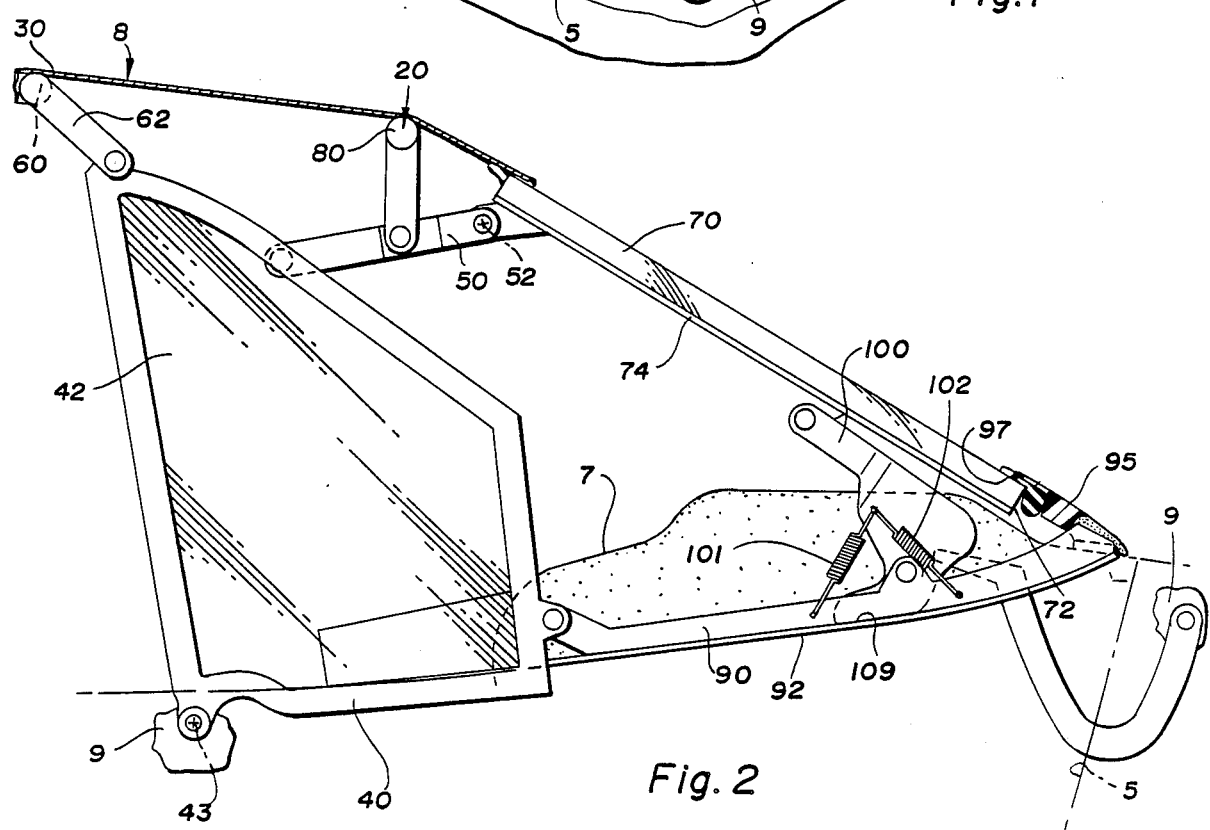
FIG. 2 is a sectional view mainly in side elevation of the vehicle top illustrated in FIG. 1 in the first upright position.

Referring to FIGS. 1-4, the vehicle convertible top 8 of the present invention has a forward linkage 10 and a rearward linkage 20. Forward 10 and rearward 20 linkages respectively support the forward and rearward portions of the cover 30. The vehicle also has a well 5 which is covered with a boot 7 which is pivotally connected with respect to the vehicle body 9. The rearward linkage 20 of the convertible top 8 in the first upright position rests on top of the boot 7 and the forward linkage 10 in the first position connects with the front windshield (not shown) of the vehicle.

Rearwardly of the forward linkage 10 there is provided two loop shaped first links 40 pivotally connected to the vehicle 9 along pivotal axis 43. Note in other embodiments (not shown) the first links 40 can in addition also be slidably mounted with respect to the vehicle 9. The first links 40 also provide the frame for the side window glass 42. Connected directly with first link 40 or via an intermediate link 62, above the pivotal connection of the first link 40 with the vehicle 9 is first rear bow 60 which spans the vehicle connecting with the other first link 40. The first rear bow 60 supports the rearward portion of the vehicle top cover 30. Also connected with the first links 40 are the upper links 50. The upper links 50 are step shaped members which are pivotally connected with the first links 40 and are also pivotally connected with a non-flexible back window glass 70 or glass frame. The upper links 50 also have connected thereto a second rear bow 80 for supporting a portion of the cover 30 rearward of the first rear bow 60.

Pivotally connected with both of the first links 40 and projecting generally rearward therefrom is a trim link or stick 90. The trim stick 90 is, in the embodiment illustrated, crescent shaped and extends between both of the first links 40. The trim stick 90 has a portion 95 generally parallel to axis 43 which is inclined and generally transverse to the portion of the trim stick 90 connected with the first link 40. The inclined portion provides a lower sealing surface 97 for the back window 70 to be pushed up against. The trim stick 90 in the first position rests on top of the boot 7. A lower surface 92 of the trim stick mates with the boot 7 to seal the interior of the vehicle 9. The boot 7 covers the convertible top 8 when the convertible top 8 is placed into the well of the vehicle in the third stored position.

The window 70 is generally transverse with the first links 40. On each side of the window 70 pivotally connected thereto is a trim stick or link extension 100. The trim stick extensions 100 are also pivotally connected to the trim stick 90 generally opposite the pivotal connection of trim stick 90 with first link 40. The trim stick extensions 100 are separated from one another by surface 97 of the trim stick 90. The trim stick extensions 100 rests upon cam surfaces 109 of the boot 7 which cams trim stick extensions 100 to force the back window 70 to pivot about a pivotable axis 52 with the upper links 50 thereby forcing the back window 70 into the sealing surface 97 of the trim stick 90 and therefore sealing the interior of the vehicle along the back window 70 bottom edge 72. The cover 30 also overlaps the back window 70 along the window side edges 74, therefore urging back window 70 toward sealing surface 97 also sealing the back window 70 along the side edges 74.

Figure 3:
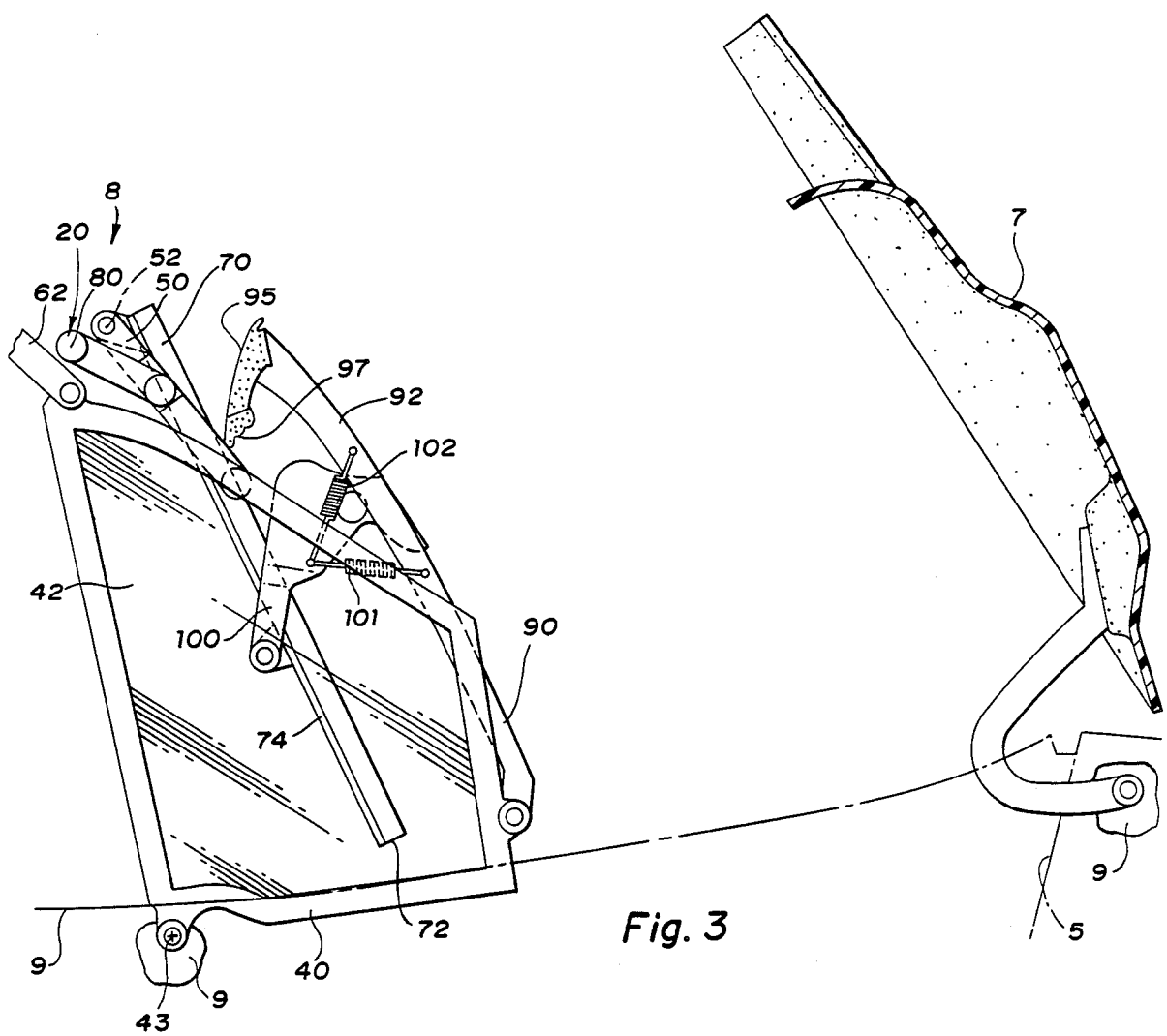
FIG. 3 is a sectional view mainly in side elevation view of a convertible top illustrated in FIG. 1 in the second intermediate folded position.
Figure 4:
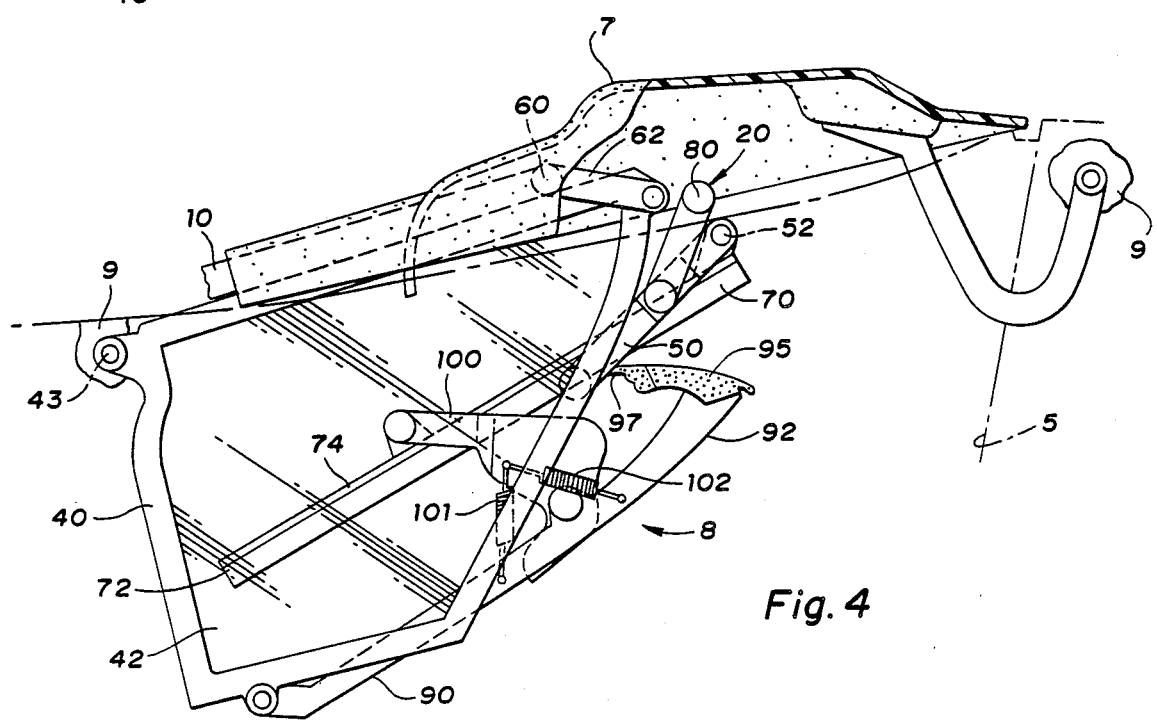
FIG. 4 is a sectional view mainly in side elevation view of the vehicle top illustrated in FIG. 1 in the third stored position.

The cover 30 is fixably connected with the top portion of the back window 70. As illustrated in FIG. 1, the vehicle convertible top 8 is in its first position. To place the vehicle convertible top 8 in a second intermediate folded position the trim stick 90 is pivoted towards the front of the vehicle 9 (FIG. 3). First 101 and second 102 springs are connected between the trim stick 90 and the trim stick extension 100. When folding the trim stick 90 forward, the first and second springs 101, 102 cooperate to pivot the trim link extension 100 counterclockwise with respect to the back window 70 (FIG. 3). The above causes the bottom edge 72 of the back window to angularly move with respect to its pivotal connection with the upper link 50 to separate away from the lower sealing surface 97. Therefore, the back window 70 will then assume a generally vertical position as shown in FIG. 3. When the trim stick 90 is fully up (FIG. 3), the boot 7 is pivoted backwards opening up the well 5 for the folded convertible top 8. The forward linkage 10 of the convertible top has already been folded back towards the first link 40 and the first link 40 is now rotated with respect to the vehicle 9 placing the compacted folded convertible top 8 from its intermediate folded position (FIG. 3) into the vehicle well 5 in a third stored position. The boot 7 is then lowered to cover the folded convertible to 8 and to provide an aesthetically pleasing appearance. To raise convertible top 8 the sequence of the steps previously mentioned is reversed.

The present invention provides a method of folding and storing a vehicle convertible top 8 including a cover 30 and a non-flexible back window 70 wherein the back window 70 seals along a bottom edge, the method including the following steps:

1. Pivotally connecting a first link 40 to the vehicle 9 generally transverse to the back window 70;

2. Pivotally connecting to the first link 40 a trim stick 90 extending rearwardly;

3. Pivotally connecting to the first link 40 above the pivotal connection of the first link 40 with the trim stick 90 an upper window link 50;

4. Pivotally connecting a non-flexible back window 70 to the upper link 50 and to a trim link extension 100 pivotally connected with the trim stick 90 whereby the back window 70 is urged to mate with an overlapping sealing surface 97;

5. Pivoting the trim stick 90 to a second intermediate folded position whereby the back window 70 is brought to a second generally vertical position;

6. Pivoting the first link 40 with respect to the vehicle 9 whereby the convertible top 8 is pivoted to a third stored position within the vehicle 9.

While an embodiment of the present invention has been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. A convertible vehicle top having a first upright position, a second intermediate folded position and a third stored position, said top in combination comprising:
   a first link pivotally connected with said vehicle;
   a trim link pivotally connected with said first link having a portion projecting relative to said vehicle generally rearwardly of said first link in said first position;
   an upper link pivotally connected with said first link above the pivotal connection of said first link with said vehicle;
   a trim link extension pivotally connected to said trim link rearwardly of the pivotal connection of said trim link with said first link;
   a lower sealing surface orientated generally transverse to said portion of said trim link; and
   a substantially rigid back window pivotally connected with said upper link and said trim link extension whereby sequentially said back window in said first position is urged to mate with said lower sealing surface and whereby pivotal movement of said trim link from said first top upright position causes said back window to be positioned generally vertically in said second intermediate top position with said window being separated from said lower sealing surface and whereby pivotal movement of said first link from said second position causes said top to be moved to said third stored position and said back window to be moved from generally vertical to a storage position.

2. A convertible top as described in claim 1 wherein said trim link is crescent shaped and wherein said lower sealing surface is fixably connected with said trim link.

3. A convertible top as described in claim 1 wherein said trim link rests on a boot, said boot being pivotally connected with said vehicle and covering said convertible top when said convertible top is in said third stored position.

4. A convertible top as described in claim 1 further including a first rear roof bow connected with said first link.

5. A convertible top as described in claim 1 further including a second rear roof bow connected with said upper link.

6. A convertible top as described in claim 1 wherein said first link is a loop providing a side window for said convertible top.

7. A convertible as described in claim 1 further including a camming surface on said vehicle to cam said trim link extension to force said back window to be urged towards said lower sealing surface.

8. A vehicle convertible top for a vehicle having cam surfaces, said top having a first upright position, a second intermediate folded position and a third stored position, said top in combination comprising:
   a cover for covering said top;
   a forward linkage for supporting a portion of said cover;
   a pair of first links each formed as a loop and pivotally connected with said vehicle providing side windows for said top, said first links each having a pivotal axis generally transverse to a longitudinal axis of said cover, and said first links having attached thereto a first rear bow for supporting a rearward portion of said cover;
   a crescent shaped trim link extending rearwardly from and pivotally connected with said first links provided an inclined lower sealing surface orientated generally parallel with said pivotal axis of said first links;
   trim link extensions pivotally connected with said trim link and separated from one another by said lower sealing surface and each resting on one of said cam surfaces;
   an upper link pivotally connected with each said respective first link above the pivotal connection of said first link with said vehicle, said upper links being connected with a second rear bow for supporting a portion of said cover rearward of said first rear bow; and
   a substantially rigid back window connected adjacent a top edge with said cover and being pivotally connected with said upper links and said trim link extensions whereby sequentially said back window in said first position is urged to mate with said lower sealing surface of said trim link and whereby pivotal movement of said trim link from said first top position to said second top position causes said back window to assume an intermediate generally vertical position separated from said lower sealing surface and whereby sequential rotation of said first link from said second top position to said third top position causes said back window to be stored into said vehicle.

9. A method of assembling, folding, and storing a vehicle convertible top including a cover and a substantially rigid back window wherein the back window seals against a lower surface, said method in combination comprising:
   pivotally connecting a first link to said vehicle generally transverse to a longitudinal dimension of said cover;
   pivotally connecting to said first link a trim link extending rearwardly of said first link and trim link pivotal connection;
   pivotally connecting to said first link above the pivotal connection of said first link with said trim link an upper window link;

pivotally connecting said substantially rigid back window to said upper link and to a trim link extension pivotally connected with said trim link whereby said back window is urged to mate with a lower sealing surface of said trim link;

pivoting said trim link from a first top upright position to a second intermediate top folded position whereby said back window is brought to a generally vertical position; and pivoting said first link with respect to said vehicle whereby said top is pivoted to a third stored position within said vehicle.

* * * * *